(12) United States Patent
Schindele

(10) Patent No.: US 10,195,686 B2
(45) Date of Patent: Feb. 5, 2019

(54) METHOD FOR JOINING TWO ESSENTIALLY METAL SHEET-TYPE WORKPIECES USING FRICTION SQUEEZE WELDING

(71) Applicant: Hochschule für angewandte Wissenschaften—Fachhochschule Kempten, Kempten (DE)

(72) Inventor: Paul Schindele, Kempten (DE)

(73) Assignee: Hochschule für angewandte Wissenschaften—Fachhochshule Kempten, Kempten (DE)

( * ) Notice: Subject to any disclaimer, the term of this patent is extended or adjusted under 35 U.S.C. 154(b) by 544 days.

(21) Appl. No.: 14/365,338

(22) PCT Filed: Nov. 9, 2012

(86) PCT No.: PCT/EP2012/004670
§ 371 (c)(1),
(2) Date: Jun. 13, 2014

(87) PCT Pub. No.: WO2013/087138
PCT Pub. Date: Jun. 20, 2013

(65) Prior Publication Data
US 2014/0374406 A1    Dec. 25, 2014

(30) Foreign Application Priority Data

Dec. 16, 2011 (DE) .................. 10 2011 121 199
Jan. 31, 2012 (DE) .................. 10 2012 001 778

(51) Int. Cl.
*B23K 20/12* (2006.01)
*B23K 5/213* (2006.01)
(Continued)

(52) U.S. Cl.
CPC ............ *B23K 20/128* (2013.01); *B23K 5/213* (2013.01); *B23K 11/34* (2013.01);
(Continued)

(58) Field of Classification Search
CPC .. B23K 20/128; B23K 20/122; B23K 20/123; B23K 2201/18; B23K 5/20; B23K 5/213;
(Continued)

(56) References Cited

U.S. PATENT DOCUMENTS 3,619,535 A * 11/1971 Sullivan ................. B23K 13/02
219/612
5,504,296 A * 4/1996 Sato ..................... B23K 1/0004
148/24

(Continued)

FOREIGN PATENT DOCUMENTS

CN    1503711    6/2004
CN    1814389    8/2006

(Continued)

OTHER PUBLICATIONS

International Search Report received in International Patent Application No. PCT/EP2012/004669, dated Feb. 6, 2013.

(Continued)

*Primary Examiner* — Christopher Kim
(74) *Attorney, Agent, or Firm* — Michael Best & Friedrich LLP

(57) ABSTRACT

The invention relates to a method for joining two essentially metal sheet-type workpieces. In said method, edge regions of the workpieces to be joined are bent by up to 90° in relation to a plane of the workpiece, the bent edge regions being placed against each other, and the edge regions are then heated to a predefined joining temperature by at least one first frictional element that moves relative to the edge regions, are subjected to a certain contact pressure, and are joined while being deformed.

24 Claims, 4 Drawing Sheets

(51) Int. Cl.
*B23K 11/34* (2006.01)
*B23K 15/00* (2006.01)
*B23K 33/00* (2006.01)
*B23K 20/26* (2006.01)
*B23K 26/60* (2014.01)
*B23K 101/18* (2006.01)
*B23K 5/20* (2006.01)

(52) U.S. Cl.
CPC ........ *B23K 15/0033* (2013.01); *B23K 20/122* (2013.01); *B23K 20/123* (2013.01); *B23K 20/26* (2013.01); *B23K 26/60* (2015.10); *B23K 33/002* (2013.01); *B23K 5/20* (2013.01); *B23K 2101/18* (2018.08)

(58) Field of Classification Search
CPC .... B23K 11/34; B23K 15/0033; B23K 20/26; B23K 26/60; B23K 33/002
USPC ....... 219/602, 603, 609, 612, 615–617, 635, 219/646, 121.6, 121.63, 121.64, 128, 129, 219/136, 137 R, 137.2, 137.8, 148
See application file for complete search history.

(56) References Cited

U.S. PATENT DOCUMENTS

| | | |
|---|---|---|
| 2003/0042292 A1 | 3/2003 | Hatten et al. |
| 2004/0134971 A1 | 7/2004 | Narita et al. |
| 2006/0169748 A1 | 8/2006 | Ezumi et al. |
| 2006/0278325 A1 | 12/2006 | Kumagai |

FOREIGN PATENT DOCUMENTS

| | | |
|---|---|---|
| DE | 38 02 300 C1 | 8/1989 |
| DE | 3781145 | 1/1993 |
| DE | 692 05 991 T2 | 4/1996 |
| DE | 102 38 550 A1 | 3/2004 |
| DE | 102006055994 | 5/2008 |
| DE | 102008044763 | 3/2010 |
| EP | 1 236 533 A1 | 9/2002 |
| EP | 1354660 | 10/2003 |
| GB | 572789 | 10/1945 |
| JP | 2000-158154 A | 6/2000 |
| JP | 2000-317652 A | 11/2000 |
| JP | 2004-174575 A | 6/2004 |
| JP | 2007-319877 A | 12/2007 |
| WO | 87/04957 | 8/1987 |
| WO | 99/39861 | 8/1999 |

OTHER PUBLICATIONS

International Search Report received in International Patent Application No. PCT/EP2012/004670, dated Feb. 6, 2013.

W. Thomas et al., "Friction Processes Benefit from a Gas Shield," Welding and Metal Fabrication, IPC Ltd. Haywards Heath, GB, vol. 666 No. 4, May 1, 1998 (4 pages).

International Search Report and Written Opinion of the International Searching Authority for Application No. PCT/EP2011/006226 dated Mar. 28, 2012 (English Translation 8 pages).

* cited by examiner

METHOD FOR JOINING TWO ESSENTIALLY METAL SHEET-TYPE WORKPIECES USING FRICTION SQUEEZE WELDING

BACKGROUND OF THE INVENTION

For the material-bonded joining of metal sheets or similar workpieces, both fusion and pressure welding methods may be used.

In the case of fusion welding methods, a common molten pool of the two parts being connected is created, with the optional addition of a filler material, usually in the form of a welding wire. This is followed by the creation of a pool solidification structure. The thermal loading of the components in the joining region is equivalent to the melting temperatures of the materials to be joined.

In the case of pressure welding methods, apart from the heating by various heat sources, such as for example electrical resistance heating, the material is brought to the softening temperature and pressed together by a pressing force, whereby a welded connection is created.

In the case of the known friction stir welding, the materials to be connected are heated by a stirring process and intermixed in the welding region. However, this method is limited to specific materials that deform well and to minimum material thicknesses.

In the case of cold pressure welding, there is likewise a restriction to softer materials and specific material thicknesses.

The joining of thin-walled workpieces, in particular the joining of metal sheets, requires special measures, since the volume of material that is made available by the workpieces in the joining region is very small and since damage to the adjacent regions of the metal sheets must be avoided. It has therefore already been proposed in the case of friction welding methods for joining thin-walled metal tubes to other bodies to widen the periphery of the metal tube before the friction welding in order to prevent notching. This is described in DE 38 02 300 C1. Another method, in which the contact zone is made as large as possible with a frictional tool, is shown by EP 1 236 533 A1.

SUMMARY OF THE INVENTION

The present invention provides, in one aspect, a method for joining two essentially metal sheet-like workpieces. The method includes beading at least two peripheral regions of the workpieces out of a plane of the respective workpiece by up to 90°, placing the beaded peripheral regions against one another, heating the peripheral regions to a predetermined joining temperature by means of at least a first frictional element undergoing a relative movement in relation to the peripheral regions, and subjecting the first frictional element to a pressing pressure to deform and join the workpieces.

The invention is based on providing a method for joining two essentially metal sheet-like workpieces which, while having a simple structure and being easy to apply at low cost, requires little expenditure on equipment and makes it possible for the sheet-like workpieces to be reliably joined.

According to the invention, it is provided that the peripheral regions to be joined of the sheet-like workpieces are respectively flanged out of a plane of the respective workpiece or beaded by up to 90°. In this way, a narrow peripheral region is beaded, although the joining weld to be achieved is of such a form in the finished state that the two plate-like workpieces are joined butting one against the other and with a constant thickness. Consequently, in the finished state of the joining weld, the method according to the invention does not produce essentially any material thickening of the two sheet-like workpieces (assuming that they are of the same thickness).

Flanging is understood for the purposes of the invention as meaning the bending of the peripheries of metal sheets or tubes by up to 90°. Consequently, a right angled bending up of the periphery takes place by an angling of the workpiece peripheries of the sheet-metal parts in the region of the joining weld. According to the invention, the joining weld may be straight or bent. In any event, a periphery rising up out of the plane of the sheet-like workpieces is formed by the flanging or beading.

In the case of the method according to the invention, the peripheral regions to be joined are subsequently placed one against the other and thereby positioned. Subsequently, the peripheral regions are heated to a predetermined joining temperature by means of a frictional element and thereby subjected to a pressing pressure. The frictional element is set in a relative movement in relation to the peripheral regions. The peripheral regions are heated by the frictional heat and thereby plastified. The pressing pressure applied by the frictional element, which acts perpendicularly to a central plane of the workpieces, and consequently presses onto the beaded or flanged peripheral regions, thereby leads to a beading of the material of the peripheral regions, and consequently to a pressing flat of the peripheral regions. The material of the beaded or flanged peripheral regions consequently serves as joining material for connecting the workpieces.

According to the invention, the frictional element is pressed with its end face onto the beaded or flanged peripheral regions; by contrast with the prior art, it is not located between the flanged edges or beaded bent-up peripheral regions.

In one embodiment of the invention, it is provided that the relative movement of the frictional element in relation to the peripheral regions takes place by a rotation and/or turning and/or oscillation of the frictional element. This relative movement produces the frictional heat required for the joining. In addition, a relative movement may take place by a longitudinal movement of the frictional element along the peripheral regions, in order to produce a longer joining weld.

The invention is consequently suitable both for joining relatively long peripheral regions to form a relatively long joining weld and for connecting the workpieces at specific points or spatially confined locations. It is consequently also possible by the friction welding method according to the invention to produce spot-welded connections. In this case, the flanged or beaded peripheral regions to be joined are correspondingly short, whether in the linear direction or in the form of round or part-circular regions.

In dependence on the joining parameters, in particular in dependence on the geometry and the material of the workpieces, it may be favorable in a development of the method according to the invention either to additionally heat the peripheral regions by means of an external heat source or to heat them by means of an additional frictional element, which is moved ahead of the first, aforementioned frictional element during a longitudinal movement of the latter. In the case of heating by means of an external heat source, resistance heating, inductive heating, heating by a flame (gas flame), a hot gas, laser, arc, electron beam, plasma jet or by smouldering contacts, in a way similar to flash butt welding, may be used.

In order to produce a smooth, not raised joining weld that is of essentially the same thickness as the workpieces, it may be favorable to smooth the joined peripheral regions in the heated state by means of a smoothing element. The smoothing element may likewise perform a relative movement in relation to the peripheral regions, in a way similar to a roller or a rotating pin moving along the longitudinal seam.

In one embodiment of the invention, an element either in the form of a rod or a roller or a roll is used as the first frictional element and/or as the additional frictional element and/or as the smoothing element. If an element in the form of a rod is used, the turning axis of which is arranged perpendicularly to the central plane of the workpieces, it is favorable if the end face of the element in rod form is beveled or provided with a radius.

According to the invention, the relative movement may also be produced by an oscillating movement of the first frictional element.

For joining very thin-walled sheet-like workpieces or for joining peripheral regions that are inexact or imprecise in their geometry, it may be favorable if at least one filler material, for example in the form of a wire, is introduced between the peripheral regions before or during the joining operation.

In order to work thick workpieces, it may be favorable to provide in addition to the first frictional element a second frictional element on the rear side of the workpiece, performing not only a supporting function but also additionally a frictional function.

According to the invention, it has been found in particular to be especially favorable if the frictional element is formed as a roller or wheel, since this allows an intensified relative movement to be imparted for plastifying the region of the weld. Among the advantages of the method according to the invention are:

- No filler material has to be used.
- Less thermal influencing than in the case of fusion welding methods.
- A square butt joint with little force flux is created.
- Little expenditure on equipment.
- High welding rates can be achieved with a high rotational speed or relative speed between the frictional element and the workpiece and optional additional introduction of heat.
- The weld can be made with a smooth surface, as a result of which there is no notching of the weld; no lap weld has to be produced as in the case of other methods, and so material is saved.
- Can be used for very many materials, even those that are difficult to weld, such as Al or Cu.
- Fine-grained weld structure created by beading operation.
- No shielding gas required.
- Oxide films that are present are reliably removed by the friction process.
- No protection from arc or laser radiation necessary.
- Out-of-position welding possible without any problem, since there is no liquid molten pool.

BRIEF DESCRIPTION OF THE DRAWINGS

The invention is described below on the basis of exemplary embodiments in conjunction with the drawing, in which.

DETAILED DESCRIPTION

Figure 1:
FIG. 1 shows a schematic side view of two flanged and positioned workpieces.

FIG. 1 shows two workpieces 1 and 2 in sheet form, which are arranged next to one another and the peripheral regions 3, 4 of which that are to be joined are flanged, bent or beaded. It can be seen that the beaded peripheral regions 3, 4 extend essentially perpendicularly to the respective central plane 12 of the workpieces 1 and 2. It is also possible according to the invention to perform less pronounced flanging of the peripheral regions, and so the flanging angle may be 90° or less.

Figure 2:
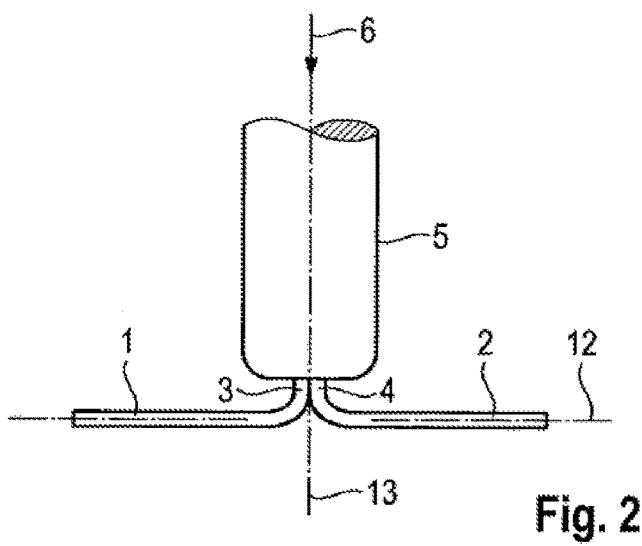
FIG. 2 shows a side view, analogous to FIG. 1, with the application of a first frictional element.

FIG. 2 shows the next method step, in which a first frictional element 5 is placed onto the peripheral regions 3 and 4. The first frictional element 5 is in this case in the form of a rod that is rounded at its end face and turned about an axis of rotation 13, in order to generate the required frictional heat. In addition, pressing by means of a pressing pressure or pressing force 6 takes place. It can be seen here that the pressing force 6 is applied perpendicularly to the central plane 12, and consequently in the direction of the peripheral regions 3 and 4. This results in a squeezing of the material of the peripheral regions 3 and 4 heated to plastifying temperature, as is represented in the side view of FIG. 3. The first frictional element 5 is moved in the advancing direction 7 by means of a longitudinal movement, in addition to the rotation about the axis of rotation 13, in order to produce an elongate joining weld.

Figure 4:
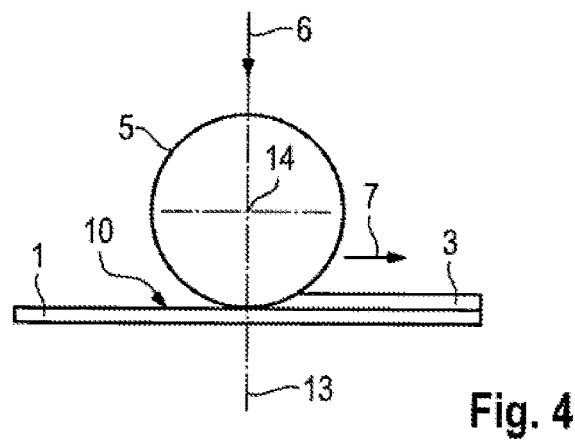
FIG. 4 shows a side view, analogous to FIG. 3, with a frictional element in the form of a roller or disk.

FIG. 4 shows a configurational variant with a frictional element 5 in disk form, which is turned about a turning axis 14, which is arranged in a plane parallel to the central plane 12. A pressing force 6 is likewise applied. The frictional element in disk form is moved in the advancing direction 7. The relative movement between the frictional element 5 and the peripheral regions 3 and 4 takes place as a result of a suitably great rotational speed about the turning axis 14, and so the frictional element 5 is not rolled along the peripheral regions 3 and 4, but is moved rotationally.

Figure 3:
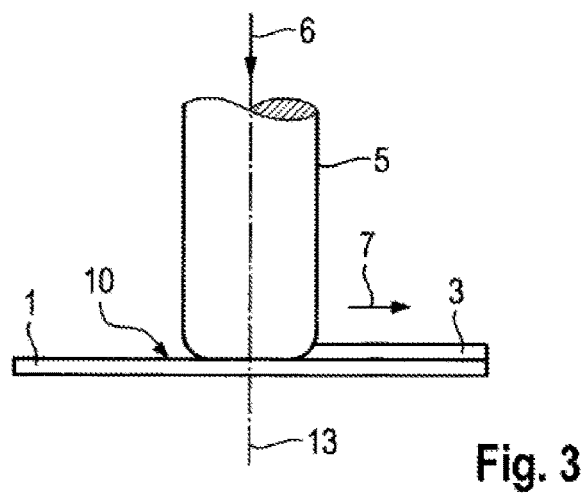
FIG. 3 shows a side view of the situation from FIGS. 1 and 2 during the joining operation.
Figure 5:
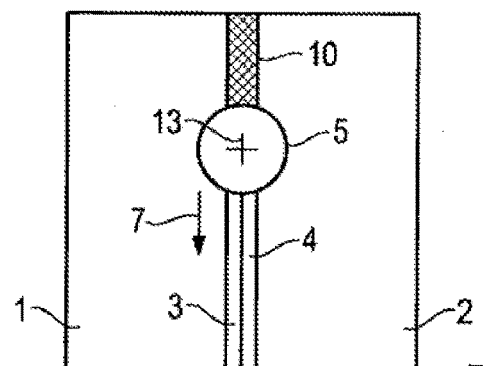
FIG. 5 shows a plan view of the situation according to FIG. 3.

FIG. 5 shows a plan view of the situation from FIG. 3 with a representation of the finished joining weld 10. It is evident that the joining weld 10 has a thickness that is equal to the material thickness of the workpieces 1 and 2.

Figure 6:
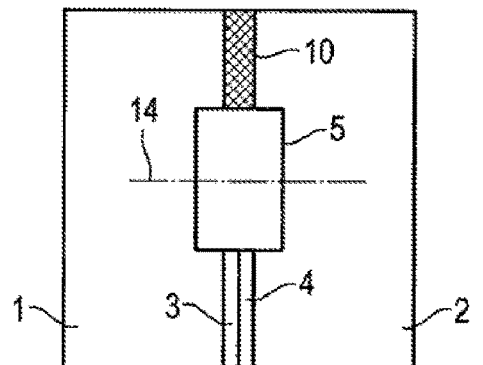
FIG. 6 shows a plan view, analogous to FIG. 5, with a frictional element in the form of a disk according to FIG. 4.

In FIG. 6, the situation represented in FIG. 4 is shown in plan view.

Figure 7:
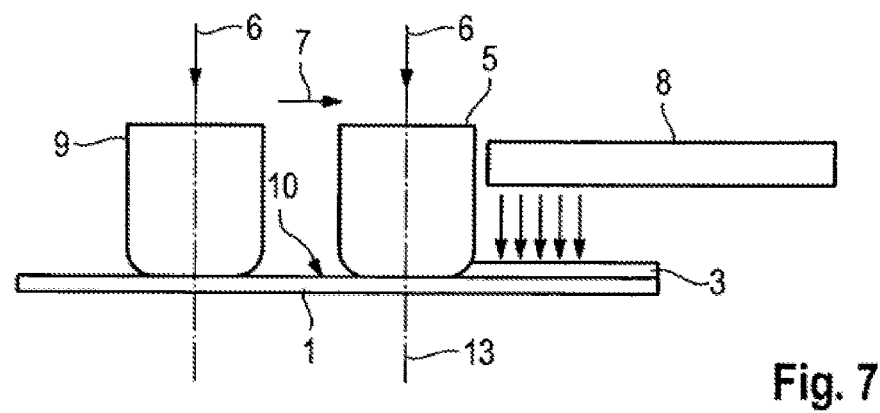
FIG. 7 shows a side view, analogous to FIG. 3, with an additional heat source and a smoothing element.

In FIG. 7, an additional heat source 8, which additionally heats the peripheral regions 3 and 4 before they come into contact with the first frictional element 5, is schematically shown.

Figure 8:
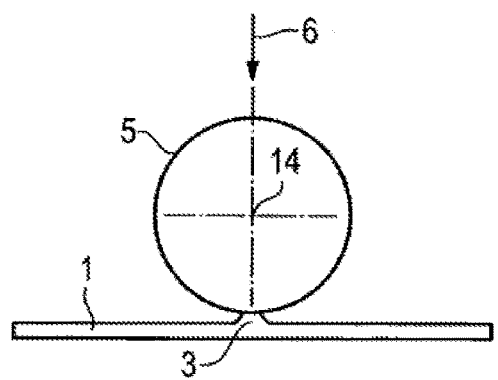
FIG. 8 shows a side view with a joint at a specific point.

Arranged behind the first frictional element 5 in the advancing direction 7 is a smoothing element 9, which smoothes the finished joining weld 10. The smoothing element 9 may likewise undergo a relative movement; it may also be formed as a rolling roller or in a similar form. A pressing force 6 may also be applied to the smoothing element 9. While in the case of the exemplary embodiments described above the joining weld is formed as a longitudinal weld, FIG. 8 shows a view, analogous to FIG. 4, with a flange essentially at a specific point. This is produced by suitable beading of a confined, small region of the workpieces 1 and 2.

Figure 9:
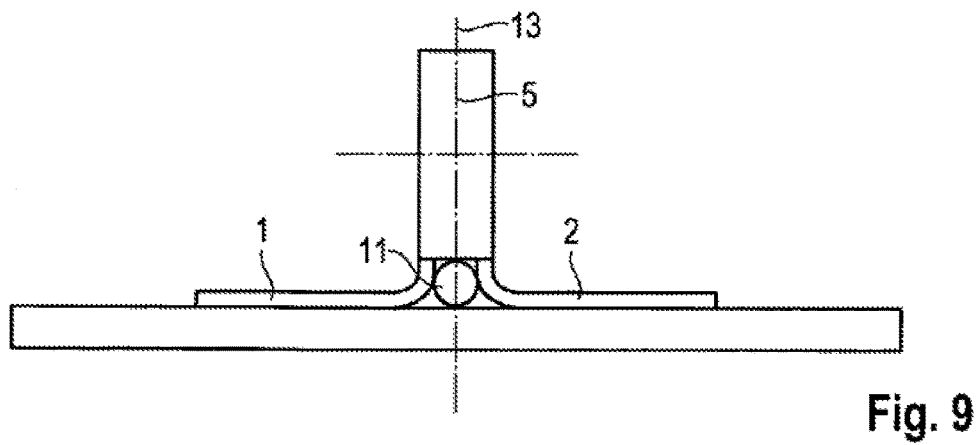
FIG. 9 shows a side view with filler material.

FIG. 9 shows an additional configurational variant, in which a filler material 11, for example in the form of a wire, is placed in the joining region between the workpieces 1 and 2, in order to add additional material.

For the welding of thicker sheets 1, 2 and a good welding of the sheets 1, 2 on the underside of the weld, it is possible to work the welding location from above and below with two frictional elements 5. This results in an even better connection of the filler material to the sheets 1, 2. The material is plastified by both frictional elements and welded to the edges of the sheets in a squeeze weld. The second frictional element has both a supporting function and a friction-imparting and beading function.

Figure 10:
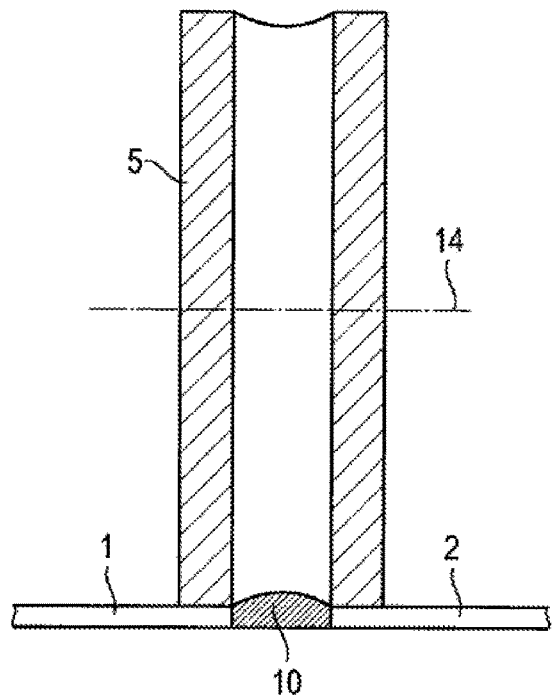
FIG. 10 shows a schematic side view, analogous to FIG. 9, of an exemplary embodiment with a profiled frictional element.

FIG. 10 shows an exemplary embodiment in which a frictional element 5 in the form of a roller or roll is used, set in rotation about its turning axis 14. The middle region of the frictional element 5 is concavely formed, and consequently has an annular region of a smaller diameter. In the case of the joining operation described above, there is consequently the possibility of making the joining weld 10 thicker, and consequently realizing a weld reinforcement. This may be enhanced by increased flanging. The view shown in FIG. 10 is a sectional view by analogy with FIG. 5, and so FIG. 10 merely shows the finished joining weld 10.

Figure 11:
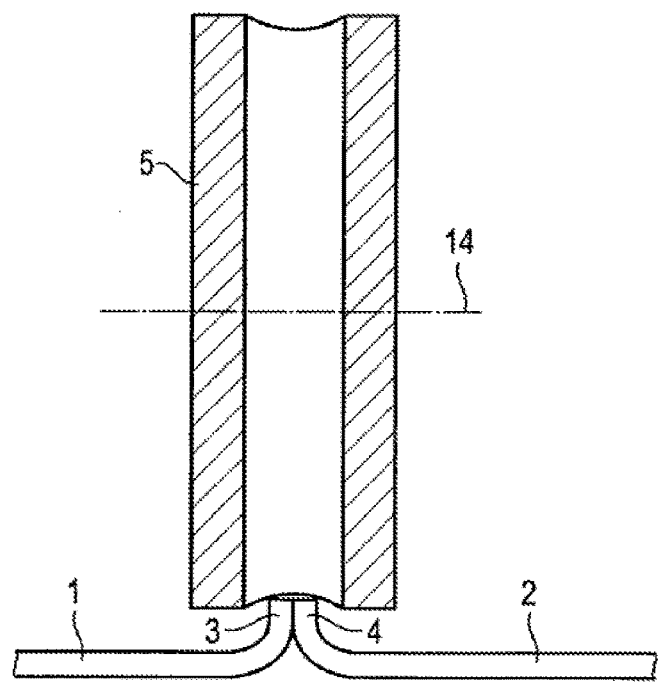
FIG. 11 shows a view, analogous to FIG. 10, of a further working situation.

FIG. 11 shows a situation analogous to FIG. 10 when placing the frictional element 5 onto the beaded or flanged peripheral regions 3, 4, in order to produce the joining weld 10 shown in FIG. 10.

According to the invention, the two sheets to be welded are consequently flanged at their joining location, butted together with the flanging location and softened by a rotating or oscillating frictional element, which takes the form of a rod or disk, by means of friction and optionally additional heat sources, and connected by a pressing force to form a squeeze weld.

The frictional element in rod form is preferably beveled or provided with a radius at its end face, whereby the material to be beaded can be engaged more easily.

The frictional element in disk form is preferably moved in a co-rotating manner in the advancing direction, but may also counter-rotate.

The flanging at the joining location and the degree of flanging is preferably such that the material deformed in the subsequent friction-imparting and squeezing process fills the gap of the joint in such a way as to create a planar surface.

The heating can be influenced by way of the relative speed of the frictional element with respect to the workpieces.

For an increase in the welding rate and for welding thicker materials, it may be advantageous if the material ahead of the welding location is additionally preheated by further external heat sources.

The following heat sources come into consideration for this: an additionally used preceding frictional element and/or resistance heating, inductive heating, a gas flame, hot gas, laser, arc, electron beam, plasma jet, smouldering contacts as in the case of flash butt welding, etc.

It may be advantageous if the weld is subsequently smoothed by a second frictional element or a rolling operation, preferably in the still warm state. This is performed with the second frictional element in rod form rotating in the opposite direction to the first frictional element.

In the case of a second frictional element in disk form, the smoothing operation may be performed both in co-rotation and in counter-rotation in relation to the advancing direction.

Various features of the invention are set forth in the following claims.

The invention claimed is:

1. A method for joining two workpieces, the method comprising:
    bending at least two peripheral regions of the workpieces out of a plane of the respective workpiece by up to 90°;
    placing the peripheral regions against one another;
    heating the peripheral regions to a predetermined joining temperature by means of at least a first frictional element undergoing a relative movement in relation to and in contact with the peripheral regions; and
    subjecting the first frictional element to a pressing pressure to deform and join the workpieces,
    wherein the relative movement produces the frictional heat required for joining the workpieces, and
    wherein, for the heating of the peripheral regions to the joining temperature, an additional frictional element is applied to the peripheral regions and moved in relation to the peripheral regions ahead of the first frictional element.

2. The method as claimed in claim 1, wherein an element in the form of a rod, with an end face that is beveled or provided with a radius and placed against the peripheral regions is used as the additional frictional element.

3. The method as claimed in claim 1, wherein an element in the form of a roller or roll placed against the peripheral regions is used as the additional frictional element.

4. A method for joining two workpieces, the method comprising:
    bending at least two peripheral regions of the workpieces out of a plane of the respective workpiece by up to 90°;
    placing the peripheral regions against one another to form a contact point therebetween;
    heating the peripheral regions to a predetermined joining temperature by means of at least a first frictional element undergoing a relative motion at the contact point, in relation to and in contact with the peripheral regions at the contact point; and
    subjecting the first frictional element to a pressing pressure to deform and join the workpieces.

5. The method as claimed in claim 4, wherein the relative movement of the first frictional element is applied by one of a rotational, turning, oscillation, and longitudinal movement along the peripheral regions.

6. The method as claimed in claim 4, wherein, for the heating of the peripheral regions to the joining temperature, an additional frictional element is applied to the peripheral regions and moved in relation to the peripheral regions ahead of the first frictional element.

7. The method as claimed in claim 6, wherein an element in the form of a rod, with an end face that is beveled or provided with a radius and placed against the peripheral regions is used as the additional frictional element.

8. The method as claimed in claim 4, wherein the joined peripheral regions are smoothed in the heated state by means of a smoothing element, which performs a relative movement in relation to the peripheral regions.

9. The method as claimed in claim 6, wherein an element in the form of a roller or roll placed against the peripheral regions is used as the additional frictional element.

10. The method as claimed in claim 4, wherein the peripheral regions are additionally heated by means of an external heat source selected from a group consisting of resistance heating, inductive heating, a gas flame, hot gas, laser, arc, electron beam, plasma jet, and smouldering contact.

11. The method as claimed in claim 10, wherein the joined peripheral regions are smoothed in the heated state by means of a smoothing element, which performs a relative movement in relation to the peripheral regions.

12. The method as claimed in claim 11, wherein the first frictional element is moved in a rotating or oscillating relative movement in relation to the peripheral regions and in a longitudinal movement along the peripheral regions.

13. The method as claimed in claim 12, wherein subjecting the first frictional element to a pressing pressure to deform and join the workpieces produces a joining weld.

14. The method as claimed in claim 8, wherein an element in the form of a rod, with an end face that is beveled or provided with a radius and placed against the peripheral regions is used as the smoothing element.

15. The method as claimed in claim 8, wherein an element in the form of a roller or roll placed against the peripheral regions is used as the smoothing element.

16. The method as claimed in claim 4, wherein an element in the form of a rod, with an end face that is beveled or provided with a radius and placed against the peripheral regions is used as the first frictional element.

17. The method as claimed in claim 4, wherein the first frictional element is moved in a rotating or oscillating relative movement in relation to the peripheral regions and in a longitudinal movement along the peripheral regions.

18. The method as claimed in claim 4, wherein subjecting the first frictional element to a pressing pressure to deform and join the workpieces produces a joining weld.

19. The method as claimed in claim 4, wherein the first frictional element is supported on a rear side of the workpieces by a second frictional element.

20. The method as claimed in claim 4, wherein an element in the form of a roller or roll placed against the peripheral regions is used as the first frictional element.

21. A method for joining two workpieces, the method comprising:
bending at least two peripheral regions of the workpieces out of a plane of the respective workpiece by up to 90°;
placing the peripheral regions against one another;
heating the peripheral regions to a predetermined joining temperature by means of at least a first frictional element undergoing a relative movement in relation to and in contact with the peripheral regions; and
subjecting the first frictional element to a pressing pressure to deform and join the workpieces,
wherein the relative movement produces the frictional heat required for joining the workpieces, and
wherein the joined peripheral regions are smoothed in the heated state by means of a smoothing element, which performs a relative movement in relation to the peripheral regions.

22. The method as claimed in claim 21, wherein an element in the form of a rod, with an end face that is beveled or provided with a radius and placed against the peripheral regions is used as the smoothing element.

23. The method as claimed in claim 21, wherein an element in the form of a roller or roll placed against the peripheral regions is used as the smoothing element.

24. A method for joining two workpieces, the method comprising:
bending at least two peripheral regions of the workpieces out of a plane of the respective workpiece by up to 90°;
placing the peripheral regions against one another;
heating the peripheral regions to a predetermined joining temperature by means of at least a first frictional element undergoing a relative movement in relation to and in contact with the peripheral regions; and
subjecting the first frictional element to a pressing pressure to deform and join the workpieces,
wherein the relative movement produces the frictional heat required for joining the workpieces, and
wherein the first frictional element is supported on a rear side of the workpieces by a second frictional element.

* * * * *